(12) United States Patent
Hundley et al.

(10) Patent No.: US 11,048,938 B2
(45) Date of Patent: Jun. 29, 2021

(54) PLANT STAND COUNTER

(71) Applicant: Monsanto Technology LLC, St. Louis, MO (US)

(72) Inventors: Christopher A. Hundley, St. Louis, MO (US); James H. Crain, St. Louis, MO (US)

(73) Assignee: Monsanto Technology LLC, St. Louis, MO (US)

( * ) Notice: Subject to any disclaimer, the term of this patent is extended or adjusted under 35 U.S.C. 154(b) by 0 days.

(21) Appl. No.: 16/385,793

(22) Filed: Apr. 16, 2019

(65) Prior Publication Data

US 2019/0244022 A1 Aug. 8, 2019

Related U.S. Application Data

(60) Division of application No. 15/350,169, filed on Nov. 14, 2016, now Pat. No. 10,303,944, which is a
(Continued)

(51) Int. Cl.
*G06K 9/00* (2006.01)
*G06K 9/20* (2006.01)
(Continued)

(52) U.S. Cl.
CPC .......... *G06K 9/00657* (2013.01); *G01S 19/13* (2013.01); *G06K 9/2018* (2013.01); *H04N 5/332* (2013.01); *G06K 2009/00644* (2013.01)

(58) Field of Classification Search
CPC ............ G06K 9/00657; G06K 9/2018; G06K 2009/00644; G01S 19/13; H04N 5/332
See application file for complete search history.

(56) References Cited

U.S. PATENT DOCUMENTS

| 7,547,508 | B1* | 6/2009 | Lefcourt | ............ | G01N 21/6408 |
| | | | | | 356/317 |
| 2001/0016053 | A1* | 8/2001 | Dickson | ............... | G01J 1/4204 |
| | | | | | 382/110 |

(Continued)

FOREIGN PATENT DOCUMENTS

WO     2010/099431 A2    9/2010

OTHER PUBLICATIONS

International Search Report from corresponding PCT/US2012/060729 dated Jan. 10, 2013.
(Continued)

*Primary Examiner* — Tracy Y. Li
(74) *Attorney, Agent, or Firm* — Sandberg Phoenix and von Gontard (57) ABSTRACT

A method for recognizing individual plants of a selected type growing in a field, wherein the method comprises capturing color NIR image data of an entire field having plants of a selected type growing therein utilizing an automated plant counting system and calculating a ratio value between each pixel of the color image data and the corresponding pixel of the NIR image data utilizing a plant recognition algorithm executed via a data processing system of the plant counting system. The method additionally comprises generating, via execution of the plant recognition algorithm, a false color image of the field based on the calculated ratios for each pixel, and identifying, via execution of the plant recognition algorithm, all plants of the selected type in the false color image based on a plant distinguishing characteristic uniquely rendered for each individual plant of the selected type in the false color image.

9 Claims, 9 Drawing Sheets

Related U.S. Application Data continuation of application No. 14/353,036, filed as application No. PCT/US2012/060729 on Oct. 18, 2012, now Pat. No. 9,495,597.

(60) Provisional application No. 61/549,320, filed on Oct. 20, 2011.

(51) Int. Cl.
    *H04N 5/33*     (2006.01)
    *G01S 19/13*     (2010.01)

(56) References Cited

U.S. PATENT DOCUMENTS

2001/0036295 A1* 11/2001 Hendrickson ......... G01J 3/2823 382/110
2003/0013937 A1 1/2003 Tsujita et al.
2007/0044445 A1 3/2007 Spicer et al.
2010/0158364 A1* 6/2010 Ma ..................... G06K 9/00657 382/165

OTHER PUBLICATIONS

Hussain. "Chapter 5. Evaluation of Measurement Systems for Quantifying Lettuce Growth," Quantifying the Role of Irrigation Uniformity on Lettuce Production and Profitability in the Lockyer Valley, Queensland, University of Southern Queensland, Nov. 2, 2010 (Nov. 2, 2010), Retrieved from the Internet:<http://www.irrigationfutures.org.au/imagesDB/news/%281%29Dissertation_AmjedHussain.pdf> on Dec. 13, 2012. entire document.

Yang et al. "Airborne Videography to Identify Spatial Plant Growth Variability for Grain Sorghum," Precision Agriculture, Jan. 1, 1999 (Jan. 1, 1999)vol. 1, pp. 67-79. entire document.

* cited by examiner

PLANT STAND COUNTER

CROSS-REFERENCE TO RELATED APPLICATIONS

This application is a divisional of U.S. patent application Ser. No. 15/350,169 filed on Nov. 14, 2016, which is a continuation of U.S. patent application Ser. No. 14/353,036, filed on Apr. 21, 2014 now U.S. Pat. No. 9,495,597, which is a national phase application of PCT International Application PCT/US2012/060729, filed on Oct. 18, 2012, which claims the benefit of U.S. Provisional Application No. 61/549,320, filed on Oct. 20, 2011. The disclosures of the above applications are incorporated herein by reference in their entirety.

FIELD

The present teachings relate to systems and methods for selectively counting plants growing in a plot.

BACKGROUND

The statements in this section merely provide background information related to the present disclosure and may not constitute prior art.

Counting the number of plants of a selected type growing in a test plot, referred to herein as stand counts, is very important data for plant testing and development programs because the number of plants in a plot is critical in the yield estimate computation. Particularly, data quality of stand counts directly effects yield quality data because when yield quality data is computed it is computed using a small footprint that is extrapolated out to a per acre computation. Hence, the precision and accuracy of stand count data can potentially influence decisions relating to the plant testing and development programs. Currently, stand count data is collected by teams of people walking through a field and hand counting the number of target plants in each plot, i.e., the particular type of plants that are the subject of the respective plant testing and development program. Although steps are taken to reduce error, the data can be unreliable due to counting errors and fatigue.

SUMMARY

In various embodiments, the present disclosure provides a method for recognizing individual plants of a selected type growing in a field, wherein the method comprises capturing color NIR image data of an entire field having plants of a selected type growing therein utilizing an automated plant counting system and calculating a ratio value between each pixel of the color image data and the corresponding pixel of the NIR image data utilizing a plant recognition algorithm executed via a data processing system of the plant counting system. The method additionally comprises generating, via execution of the plant recognition algorithm, a false color image of the field based on the calculated ratios for each pixel, and identifying, via execution of the plant recognition algorithm, all plants of the selected type in the false color image based on a plant distinguishing characteristic uniquely rendered for each individual plant of the selected type in the false color image.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

Corresponding reference numerals indicate corresponding parts throughout the several views of drawings.

DETAILED DESCRIPTION

The following description is merely exemplary in nature and is in no way intended to limit the present teachings, application, or uses. Throughout this specification, like reference numerals will be used to refer to like elements.

Figure 1:
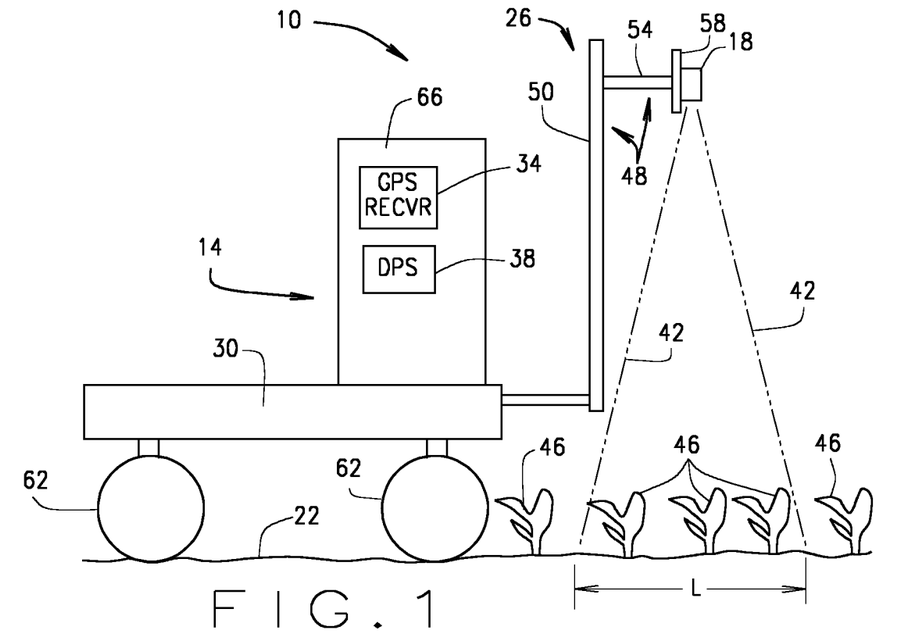
FIG. 1 is a schematic side view of an automated self-propelled plant counting system, in accordance with various embodiments of the present disclosure.
Figure 2:
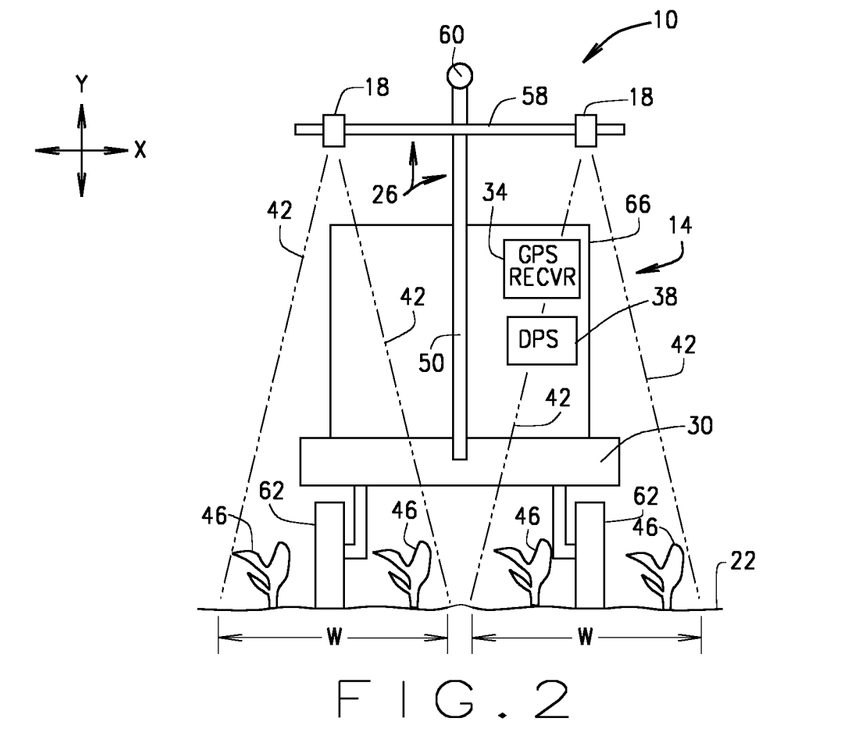
FIG. 2 is a schematic front view of the automated self-propelled plant counting system shown in FIG. 1, in accordance with various embodiments of the present disclosure.
Figure 3:
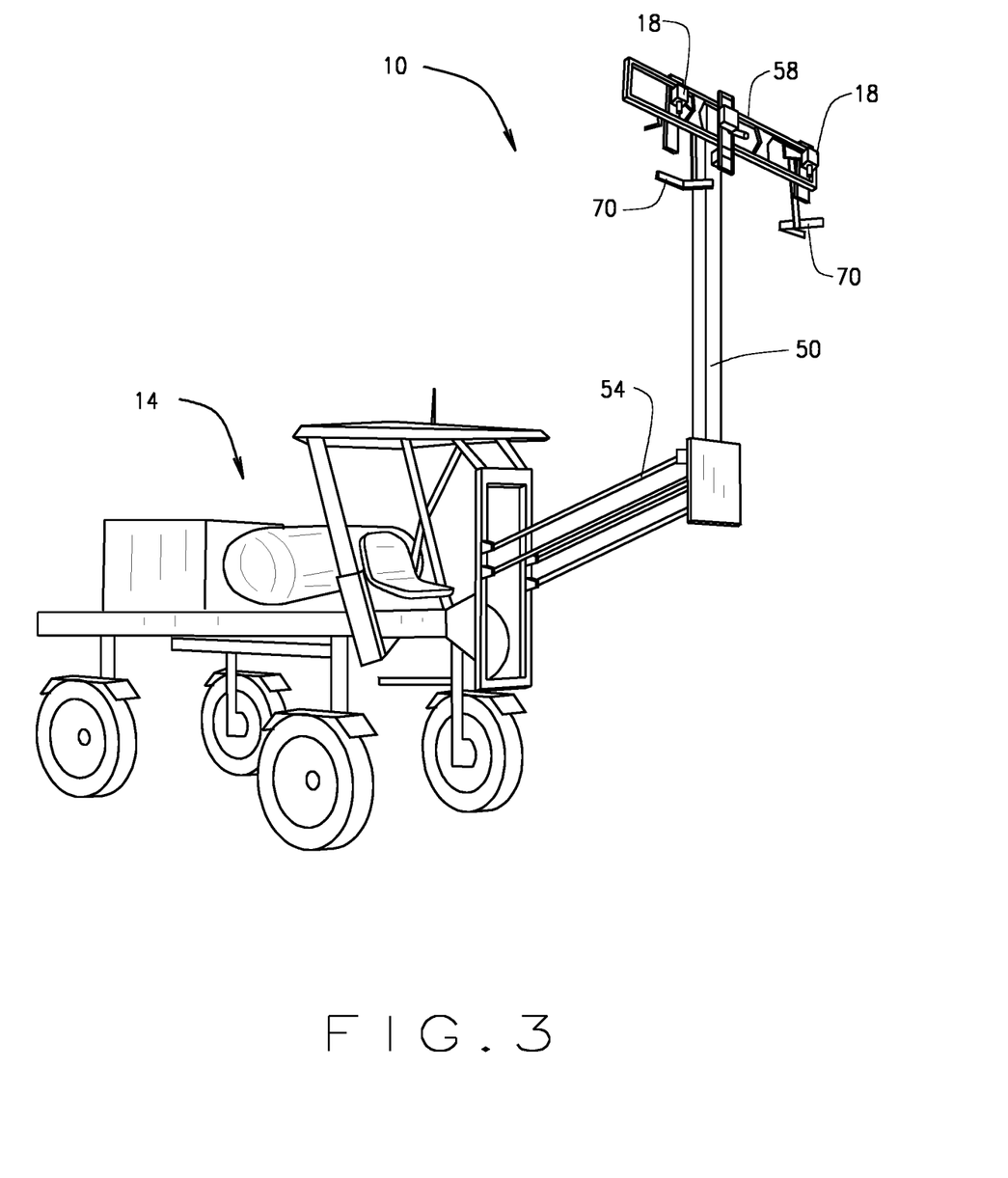
FIG. 3 is an isometric view of the automated self-propelled plant counting system shown in FIG. 1, in accordance with various embodiments of the present disclosure.
Figure 4:
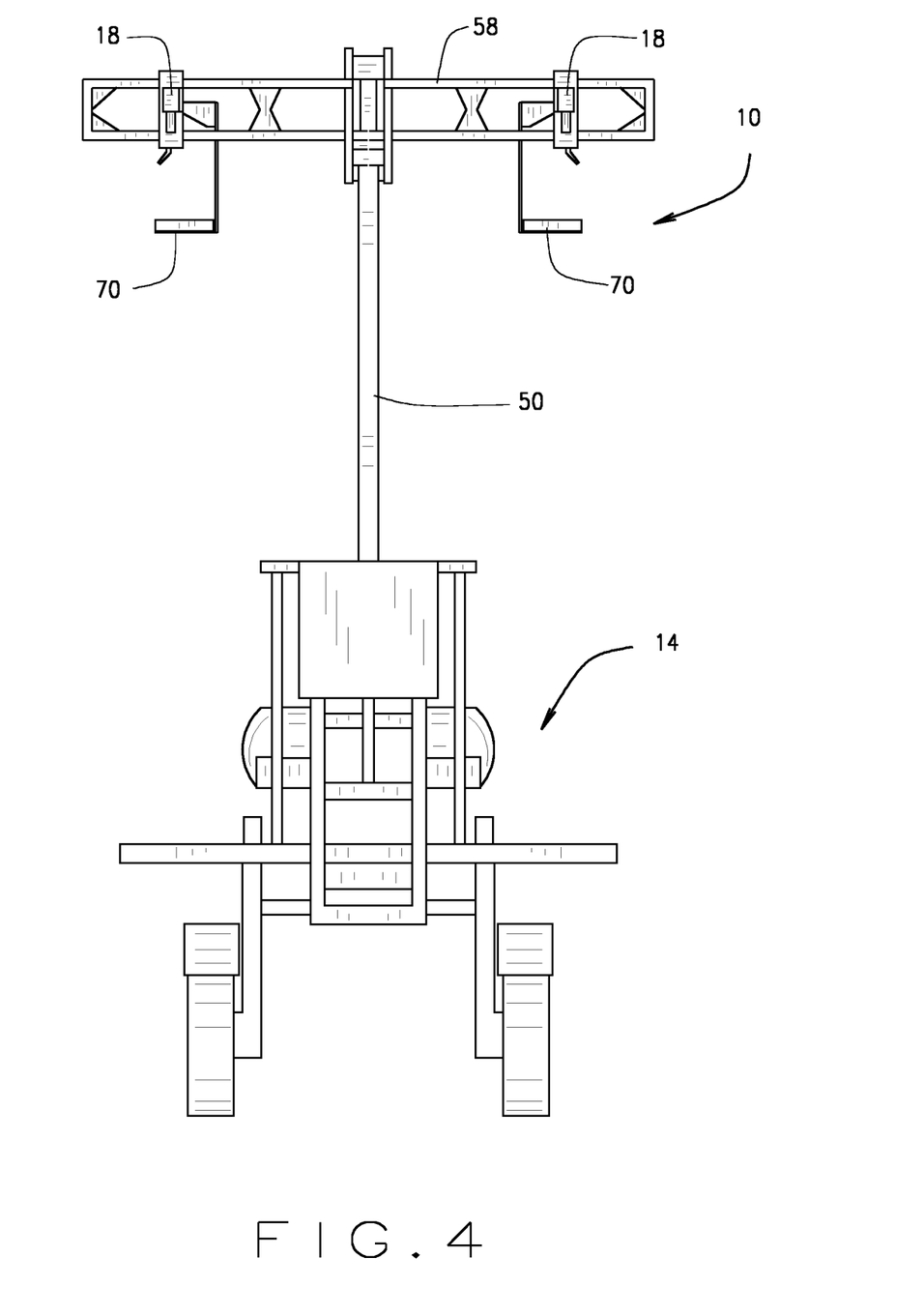
FIG. 4 is a front view of the automated self-propelled plant counting system shown in FIG. 1, in accordance with various embodiments of the present disclosure.

Referring to FIGS. 1 and 2, the present disclosure provides an automated self-propelled plant counting system 10 that is structured and operable to move through a field, e.g., a test plot, and count the number of plants of a selected type, e.g., corn plants, cotton plants, etc., growing in the field by recording real-time images of plants as the system 10 traverses the field. More specifically, the system 10 simultaneously captures color images and near infrared (NIR) images of the entire field as the system 10 travels down the rows of plants and utilizes the captured color and NIR images to identify a specific characteristic, referred to herein as the plant distinguishing characteristic, of the selected plant type. The plant distinguishing characteristic of a plant can be any genotypic, phenotypic or spatial characteristic of the respective plant that distinguishes the respective plant from other plants and materials that may be growing in the field. For example, if the number of corn plants growing in one or more test plots is to be counted, the system 10 utilizes the captured color and NIR images to recognize a particular plant distinguishing characteristic of corn plants, e.g., the whorl of a corn plant. As used herein, the whorl of a corn plant will be understood to mean the arrangement of several leaves radiating in a spiral pattern from the point of attachment to the upper portion of the corn stalk.

Referring now to FIGS. 1, 2, 3, 4, 5 and 5A, generally the system 10 includes a self-propelled mobile platform 14 and one or more multispectral cameras 18 suspended above a ground surface 22 by a camera suspension and positioning assembly 26 mounted to a chassis 30 of the mobile platform 14. The system 10 additionally includes a Global Positioning System (GPS) receiver 34 and a computer based data processing system 38 that is communicatively connected to the camera(s) 18 and the GPS receiver 34 and illumination detection device 70 (described below), via wired or wireless connections. Although the system 10 can include one, two, three or more cameras 18 and remain within the scope of the present disclosure, for simplicity and clarity the system 10 will be described and illustrated herein as including two cameras 18.

The mobile platform 14 can be any terrestrial or aerial vehicle structured and operable to traverse a field, e.g., a test plot, and count the number of plants of a selected type, e.g., corn plants, cotton plants, etc., growing in the field by recording real-time images of plants as described herein. For example, in various embodiments, the mobile platform 14 can be a lightweight terrestrial vehicle that is easily transportable from one location to another, e.g., can be towed on a trailer connected to a pickup truck or transported on a flatbed truck or larger truck without any oversized load requirements, and will not damage or compact the ground surface 22 such as a modified spider sprayer. Alternatively, it is envisioned that in various other embodiments, the mobile platform 14 can be a lightweight aerial vehicle, e.g., an unmanned aerial vehicle, that is easily transportable from one location to another, e.g., can be towed on a trailer connected to a pickup truck or transported on a flatbed truck or larger truck without any oversized load requirements. However, for clarity and simplicity, the mobile platform 14 will be exemplarily described and illustrated herein with regard to a terrestrial vehicle.

The camera suspension and positioning assembly 26 is structured and operable to adjustably suspend the cameras 18 at a desired height along a Y-axis above the ground surface 22 and adjustably position the cameras 18 laterally along an X-axis such that each camera 18 has field of view 42 having a width W that encompasses one or more plants 46 in a desired number of rows of plants 46. For example, in various embodiments, the camera suspension and positioning assembly 26 can comprise a mast and boom subassembly 48 and a horizontal stage 58 mounted to the mast and boom subassembly 48. The mast and boom subassembly includes a boom 54 connected to the mast 50 and the horizontal stage 58 is mounted to the mast 50 or the boom 54, depending on the configuration of the mast 50 and boom 54. In such embodiments, the boom 54 is structured and operable to move the cameras 18 vertically up and down along the Y-axis to position the cameras 18 at a desired height above the ground surface 22 and the plants 46, and the horizontal stage 58 is structured and operable to move each of the cameras 18 horizontally back and forth along the X-axis to position the cameras 18 at a desired position above the rows of plants 46. In various embodiments, the camera suspension and positioning assembly 26 can additionally include a winch 60 structured and operable to move the stage 58 up and down along the Y-axis to position the cameras 18 at the desired height above the ground surface 22 and the plants 46.

Accordingly, the camera suspension and positioning assembly 26 is structured and operable to vertically and horizontally adjust the position of the cameras 18 so that the field of view 42 for each camera 18 encompasses a desired number of plants 46 in a desired number of rows.

In addition to the chassis 30, mobile platform 14 generally includes an engine and drivetrain (not shown) operable to rotate a plurality of wheels 62 to propel, i.e., impart movement on, the mobile platform 14 through the field of plants 46 and a cab 66 in which a driver can be positioned to operate the mobile platform 14 and the various components and assemblies thereof as described herein, and to guide/steer and otherwise control movement of the mobile platform 14 through the field. Alternatively, the mobile platform 14 could include tracks instead of the wheels 62. The GPS receiver 34 and data processing system 38 can be disposed at any suitable convenient location of the mobile platform 14, e.g., within the cab 66. Alternatively, one or more components of the data processing system can be located remotely from the mobile platform 14 and communicatively, wired or wirelessly, to the cameras 18, the GPS receiver 34, and illumination detection device 70 (described below).

Additionally, the computer based data processing system 38, as described herein, can be any general-purpose computer comprising an electronic memory device, e.g., a hard drive, external memory stick or other electronic memory device, and a processor suitable for executing one or more plant recognition programs or algorithms (hereafter referred to simply as the plant recognition algorithm) that utilize the received GPS data and the captured color and NIR image data to identify the particular plant distinguishing characteristic of the selected plant type, e.g., the whorl of a corn plant. Alternatively, it is envisioned that the computer based data processing system 38 can be any other computer based system or device disposed on or remotely from the mobile platform 14 such as a smart phone, hand held computer or other computer based system/device that comprises memory and a processor capable of executing the plant recognition algorithm.

The GPS receiver 34 can be any GPS receiver suitable for receiving satellite positioning data signals identifying the geospatial location of the system 10 as it traverses the field collecting the color and NIR image data, and then communicating the received data to the data processing system 38. For example, in various embodiments, the GPS receiver 34 can be a high resolution real-time kinematic GPS receiver operable to receive the satellite positioning data signals and generate a National Marine Electronics Association (NMEA) output that is communicated to the data processing system 38.

As described above, each camera 18 is a multispectral camera. More particularly, in various embodiments, each camera 18 includes two charged-couple device (CCD) sensors, one sensor being a full color image sensor and the other being an NIR sensor. As described below, in various other embodiments, each camera 18 can include sensors to capture image data in bandwidths other than NIR. However, for simplicity, the cameras 18 will be described herein as including NIR sensors. Therefore, as the system 10 travels through the field, each camera 18 captures color image data and NIR image data at periodic intervals, e.g. every two, three, four or more feet, based on the GPS data received from the GPS receiver 34.

Operation of the system 10 will now be described. Initially, the system 10 is positioned at a head land of a field with the wheels 62 aligned with two corresponding furrows. Next the boom 54 is operated, manually or automatically, to raise or lower the stage 58, and hence, the cameras 18, along the Y-axis to position the cameras 18 at a desired height where the field of view 42 of each camera 18 has a width W that is wide enough to include any desired number of rows of plants 46, e.g., the field of view width W is wide enough to include one, two, three or more rows of plants 46. Subsequently, the horizontal stage 58 is operated, manually or automatically, to independently move the cameras 18 laterally along the X-axis to align the cameras 18 so that the field of view 42 of each camera 18 is centered over the desired number of rows of plants 46. Therefore, the field of view 42 of each camera will include one or more plants 46 in the desired number of rows. Alternatively, the horizontal stage 58 can be operated to center the field of view 42 of each camera 18 over the desired number of rows and then the boom 54 can be operated to position the cameras 18 at the desired height such that the width W of field of views 42 includes the desired number of rows.

Once the cameras 18 are positioned and aligned, the data processing system 38 is operated to begin execution of the plant recognition algorithm, the GPS receiver 34 receives position data indicative of the starting location of the system 10 within the field, and each camera 18 is operated (via control of the data processing system 38) to simultaneously capture an initial full color image and an initial NIR image and communicate the color and NIR image data to the data processing system 38. The mobile platform 14 then begins operation to start moving the system 10 along the rows of plants 46. As the system 10 moves along the rows the GPS receiver 34 constantly receives position data indicating the real-time location of the system 10 within the field. As the system 10 moves along the rows, the data processing system 38 utilizes the GPS data to determine the distance the system 10 has moved through the field.

As described above, the cameras 18 are positioned and aligned to have a field of view 42 that encompasses one or more plants 46 in the desired number of rows. More specifically, once the cameras 18 are positioned and aligned to have the field of view width W, the data processing system 38 can calculate a length L of the field of view 42 for the cameras 18. Subsequently, as the system 10 moves through the field the data processing system 38, via execution of the plant recognition algorithm, determines when the system 10, and particularly the cameras 18, have moved a distance L−x, wherein x is a predetermined overlap distance. Particularly, the distance L−x is utilized as a periodic interval at which the cameras 18 will be operated by the data processing system 38 and will capture sequential sets of the color and NIR image data as the system 10 moves through the field. Because the periodic interval of the image data capture is L−x, wherein L is the length of the field of views 42, each set of color and NIR data captured will comprise overlapping image data with the image data captured at the previous periodic interval L−x. Accordingly, simultaneous color and NIR image data will be captured of all the plants 46 in the entire field with no gaps in the collected image data. Additionally, in various embodiments, the cameras 18 are configured to match the full color image data with the NIR image data to within one pixel.

Referring now to FIGS. 3, 4, 5 and 5A, in various embodiments, the system 10 further includes one or more illumination detection devices 70, e.g., one for each camera 18, that are utilized to adjust the light intensity of the color and NIR image data collected according to the light intensity, i.e., the amount of sunlight, present as each set of color and NIR image data is captured. Therefore, the light intensity for all the color and NIR image data captured as the system 10 traverses the field will be normalized and substantially equal. Such image normalization, improves the consistency of the color and NIR image data resulting in more reliability of a defined response across a broader range of illuminance intensities. This broader range means less effect on the variation of image response from cloud cover induced variations in light intensity.

In various implementations, the illumination detection device(s) 70 can comprise light intensity reference cards that are positioned within the field of view 42 of each respective camera 18. Each reference card 70 includes three colored portions, wherein the first portion is a light color, e.g., white, the second portion is a mid-darkness color, e.g., gray, and a third portion is a dark color, e.g., black. During operation of the system 10 in the field, along with each set of color and NIR image data captured, each camera 18 can also capture reflectivity data, referred to as reflectance values, for each portion of the respective reference card 70. Thereafter, the data processing system 38 can utilize the reflectance values to adjust, i.e., normalize, the respective color and NIR image data captured according to the corresponding reflectance values. Therefore, the reference cards 70 provide real-time illuminance information, whereby all the color and NIR image data collected can be normalized to negate the effects of changes in sunlight during the capture of the color and NIR image data, thereby improving the consistency and reliability of the captured color and NIR image data.

Figure 5:
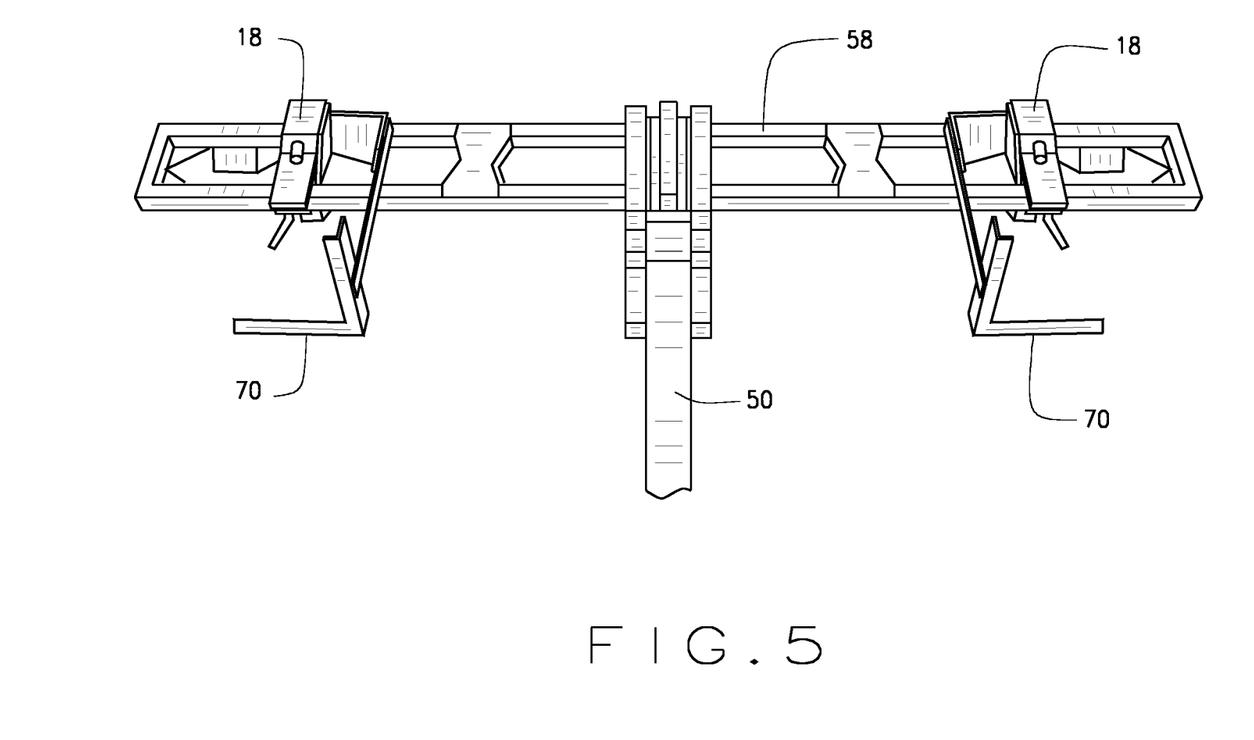
FIG. 5 is an illustration of a horizontal stage of the automated self-propelled plant counting system shown in FIG. 1, in accordance with various embodiments of the present disclosure.
Figure 5A:
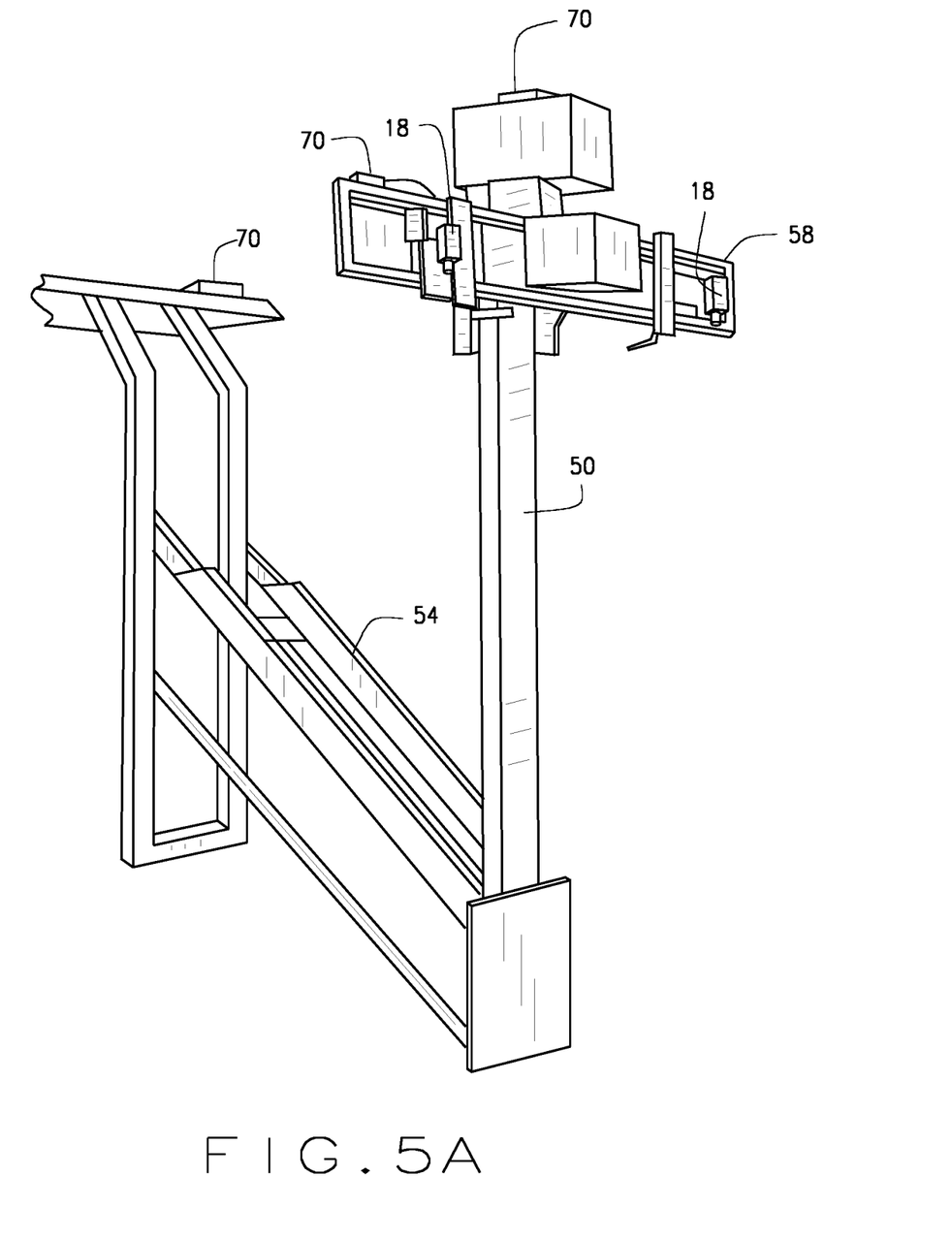
FIG. 5A is an isometric view of a mast and boom assembly, and a stage and camera assembly of the automated self-propelled plant counting system shown in FIG. 1, in accordance with various embodiments of the present disclosure.

In various other embodiments, as exemplarily illustrated in FIG. 5A, in various embodiments, the illumination detection device(s) 70 can comprises one or more illuminance meter, e.g., photometers, mounted on the plant counting system 10 in any suitable location where the sensors of the illuminance meter(s) 70 have constant exposure to the respective sunlight and will not be overshadowed, at any time, by any other part, structure or component of the plant counting system 10. For example, in various embodiments, the illuminance meter(s) 70 can be mounted on top of the mast 50, and/or on top of the stage 58 and/or on top of a cab of the mobile platform 14. In such embodiments, the illuminance meter(s) 70 are operable to provide real-time illuminance information, i.e., real-time light intensity data, to the data processing system 38 for the image normalization process. Furthermore, in such embodiments the possibility for shadows to taint the light intensity reference data used to normalize images is eliminated.

Particularly, the illuminance meter(s) 70 measure light intensity and the data processing system 38 correlates the illuminance values (lux) in real-time to the corresponding color and NIR image data that were acquired at the same point in time. As described above, the illuminance meter(s) 70 is/are never shadowed by any part of the plant counting system 10, regardless of direction of travel or angle of sun during operation. Utilization of the illuminance meter(s) 70 generally includes two phases: a calibration phase and an operating phase. It is desirable to complete the calibration phase the same day the system 10 is operated to collect the color and NIR image data. This will ensure that the light conditions for which the calibration took place are consistent with the conditions experienced during the operation phase.

Figure 5B:
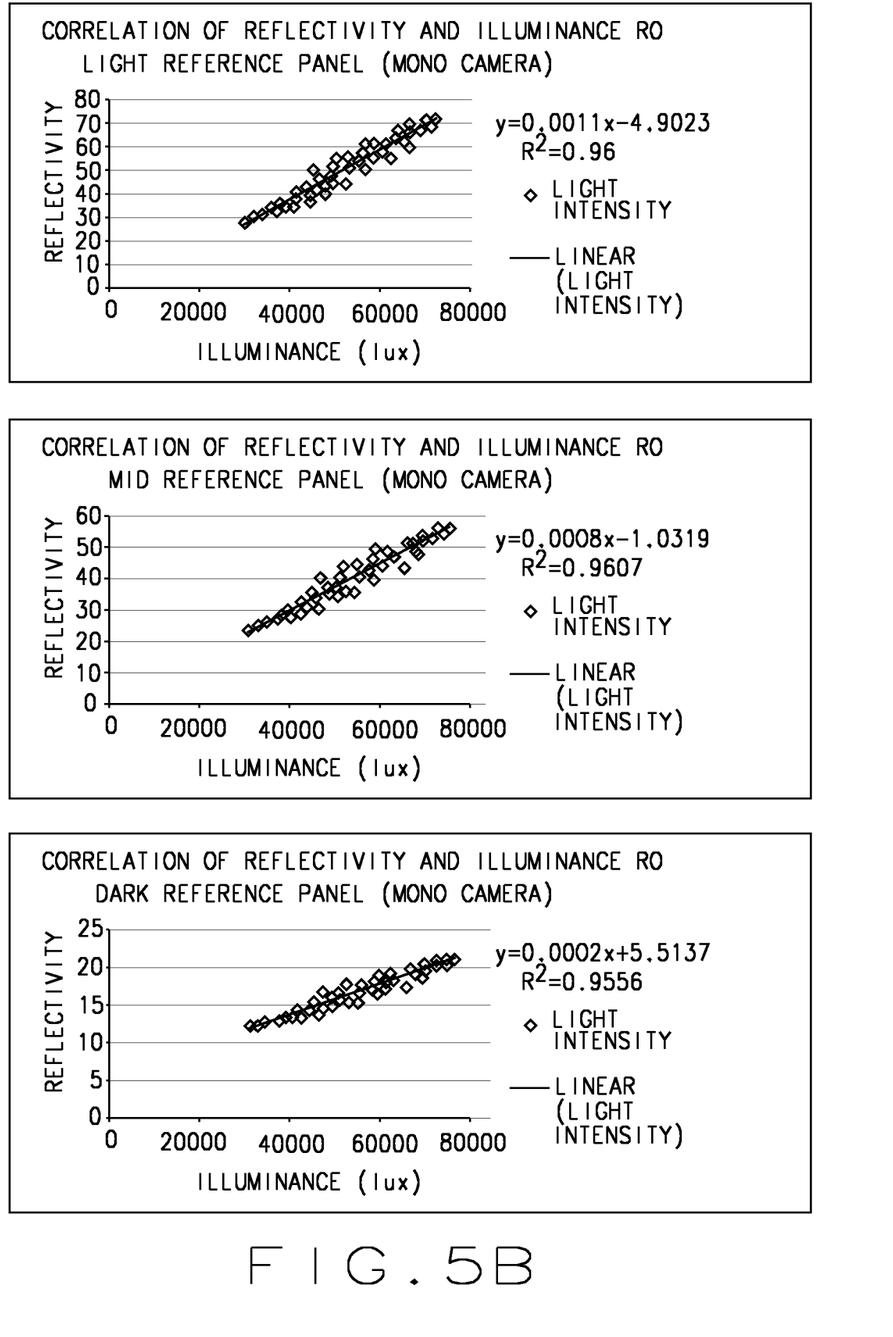
FIGS. 5B and 5C are illustrations of various charts showing a relationship between reflectivity and illuminance reading captured during a calibration process of multispectral cameras of the self-propelled plant counting system shown in FIG. 1, in accordance with various embodiments of the present disclosure.
Figure 5C:
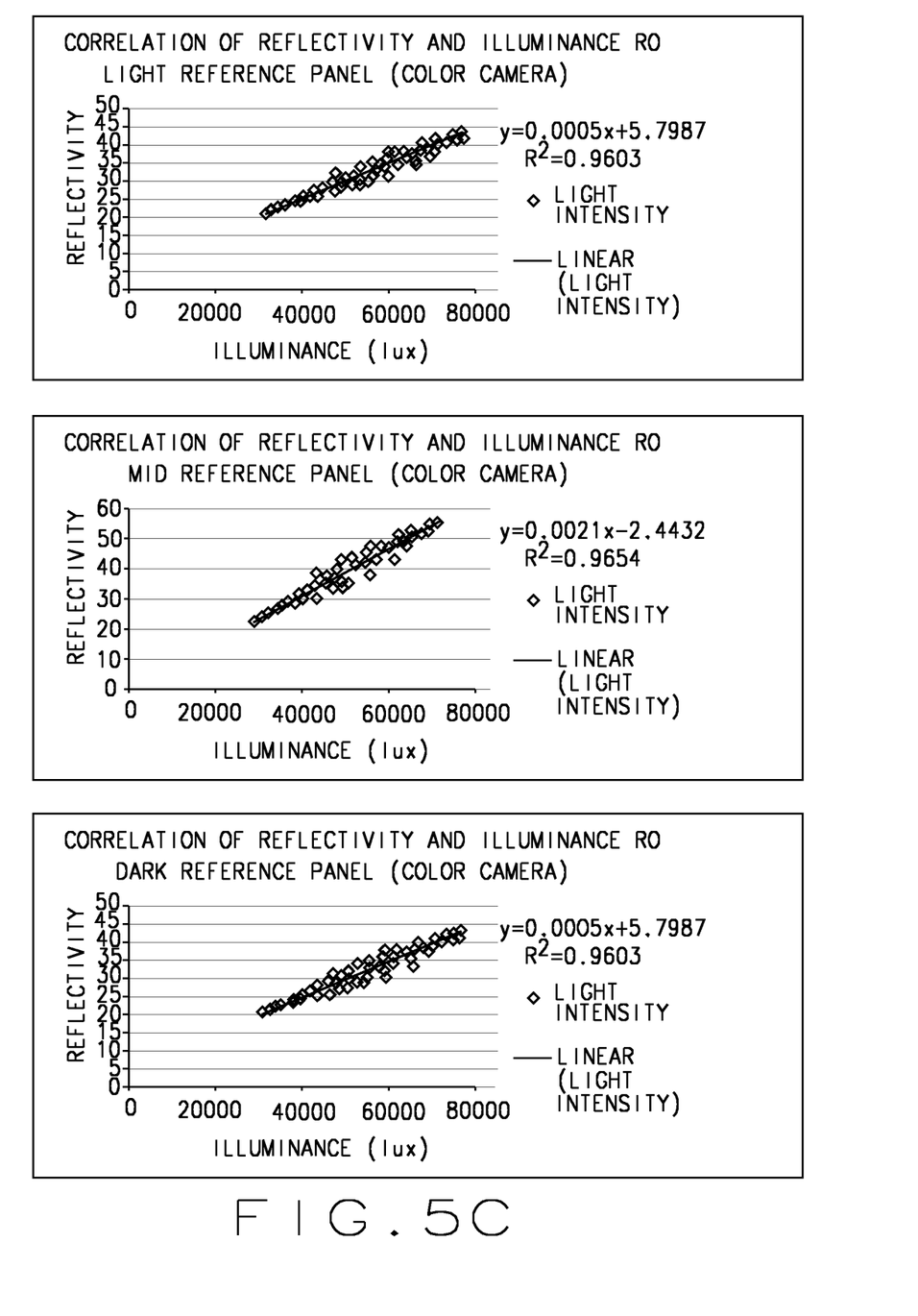

Generally, in the calibration phase, a procedure is conducted, independent of the collection of the color and NIR image data during operation of the system 10 in a field, to correlate light intensity to reflectance values collected from reference cards, similar to the reference cards 70 described above, for a broad range of light intensities. Subsequently, a series of calibration curves, shown in FIGS. 5B and 5C, are generated for reflectivity and illuminance values, of the three different reference card colors (light/white, mid/gray, and dark/black) for both the color and NIR images of the multispectral cameras 18. This results in a total of six curves for each multispectral camera 18. During the calibration procedure, the references cards are positioned in a way that they are not shadowed. Data is collected for a period of time such that a broad range of illuminance intensity values are captured (e.g., low to high values). A computation is then performed in the software, executable by the data processing system 38 or other such computer based system, to fit curves to a regression equation for each of the six curves (e.g., one equation for white, one for gray, and one for the dark reference card colors, respectively). The resulting regressing equations can then be utilized to normalize the color and NIR image data captured during operation of the system 10 in the field.

During the operation phase, as the system 10 traverses the field, the illuminance meter(s) 70 capture light intensity values, i.e., illuminance data, for each set of color and NIR image data captured. The light intensity values generated by the illuminance meter(s) 70 are collected in real-time for each set of color and NIR image data and stored in memory of the data processing system 38. Subsequently, in real-time, the data processing system 38, utilizes the captured light intensity values and the regression equations generated during the calibration phase to predict a relative reflectance corresponding to each set of color and NIR image data captured. In various implementations, the relative reflectance prediction routine can be part of the plant recognition algorithm. Alternatively, the relative reflectance prediction calculation can be independent of the plant recognition algorithm. Utilizing the predicted relative reflectance, in real-time, the data processing system 38 then normalizes each set of color and NIR image data captured, via execution of the plant recognition algorithm. Thereafter, the normalized data is used to determine number of plants of a selected type growing in the field via execution of the plant recognition algorithm, as described below.

Alternatively, in other implementations, the data processing system 38 could monitor the light intensity, via the cameras 18 and the illumination detection device 70, e.g., reference cards or other suitable light sensor, e.g., a photometer. Utilizing the light intensity data, the data processing system 38 can then control the shutter speed of each camera 18 to regulate the light exposure for each set of color and NIR image data captured. Therefore, all image data collected can be normalized to negate the effects of changes in sunlight during the capture of the color and NIR image data, thereby improving the consistency and reliability of the captured multispectral image data.

Figure 6:
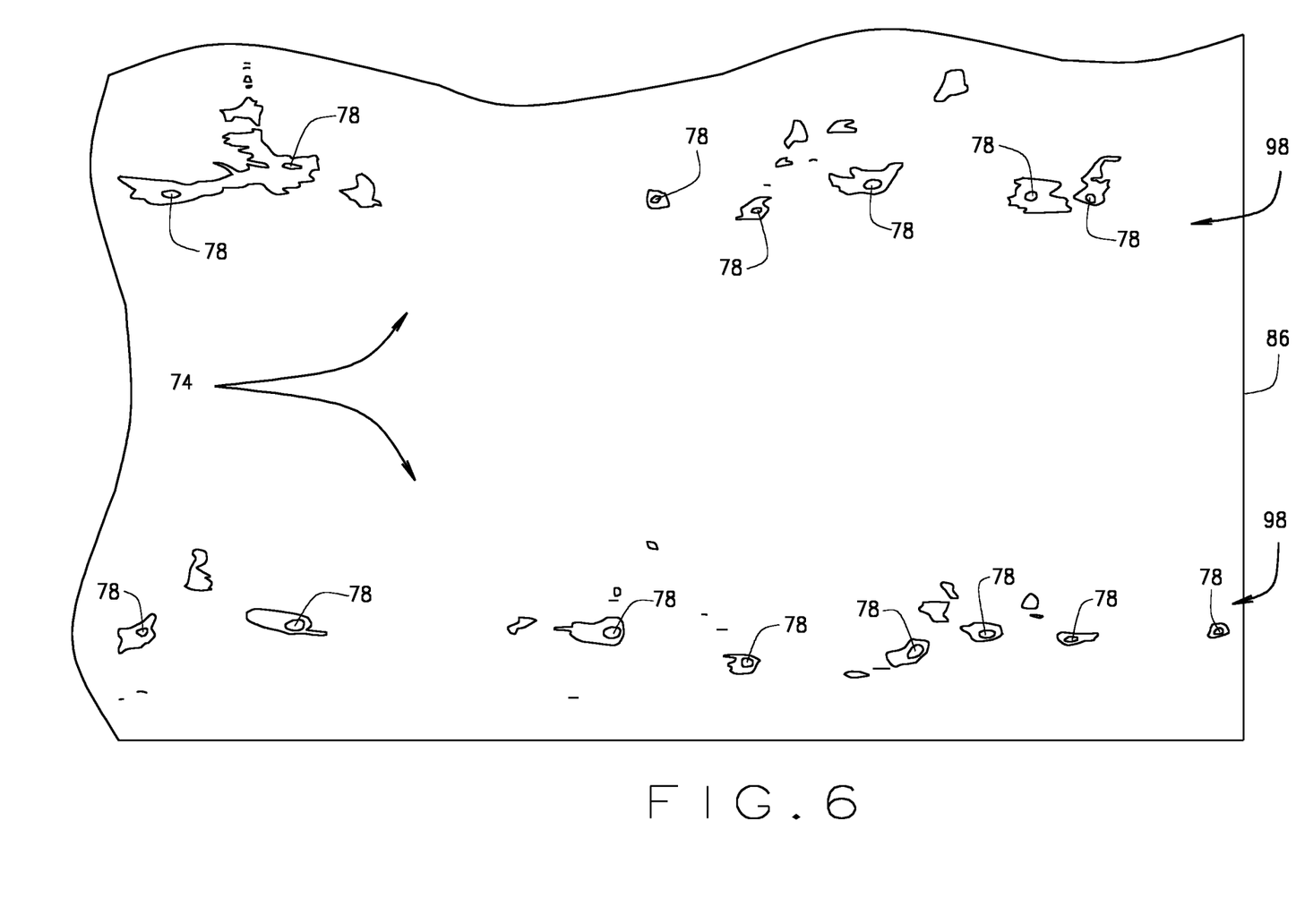
FIG. 6 is a rendering of a portion of a false color image of a plot of plants, showing a portion of two of a plurality of rows of plants in the plot, generated by the automated self-propelled plant counting system shown in FIG. 1, in accordance with various embodiments of the present disclosure.

Referring now to FIG. 6, as the system 10 moves through the field, each set of color and NIR image data captured at the periodic intervals is communicated to the data processing system 38 where the sets of image data from each camera 18 are normalized, stored and analyzed via execution of the plant recognition algorithm. Particularly, execution of the plant recognition algorithm calculates a pixel by pixel color ratio between the normalized color and NIR image data for each set of image data captured. That is, the algorithm takes each pixel from the color image data and compares it to the same pixel from the NIR image data and calculates a color ratio between the two, which provides a numeric value for each pixel. This numeric value is sometimes referred to as a normalized difference vegetative index (NDVI), which is correlated to the amount of chlorophyll contained in the various parts of the plant, and therefore, can be used to detect the level of chlorophyll contained in various parts of a plant. In various embodiments, the NDVI calculation is made on a pixel by pixel basis utilizing the following equation:

$$(NIR-Red)/(NIR+Red)$$

where NIR is the value of the near-infrared monochrome pixel and Red is the red value of the color pixel. Alternatively, the same computation can be made using the green value for each color pixel. This NDVI calculation is made for each image data set captured by each camera 18.

Subsequently, the plant recognition algorithm utilizes the NDVI value for each pixel and generates a false color image 74 for each set of image data. That is, execution of the plant recognition algorithm assigns a particular color to specific NDVI values such that each pixel is assigned a color based on the respective NDVI value, thereby creating a color image, i.e., the false color image 74, utilizing the NDVI values for each pixel. For example, in various implementations, low NDVI values, i.e., low ratio values, indicate responses for soil, water and non-living plant material and are assigned light neutral background colors in the false color image 74. Conversely, the higher NDVI values indicate areas of the plants with higher chlorophyll density and are respectively assigned darker colors that contrast with the background colors in the false color image 74. One skilled in the art would readily understand that the chlorophyll density, as indicated by the NDVI values, is related to the amount of chlorophyll in the cells of the respective plants 46, but can also be related to the density of the plant matter for the respective plants 46.

The false color image 74 will illustrate the location of highest level of chlorophyll in plants within each set of image data. And more particularly, because areas with higher levels of chlorophyll will be represented as certain colors in the false color image 74, the false color image 74 will uniquely render the desired plant distinguishing characteristic 78, thereby indicating the locations of a desired plant distinguishing characteristic 78 within each set of image data. For example, if the plants 46 are corn plants the plant distinguishing characteristic 78 will be the whorl (i.e., the whorl 78). The false color image 74 will uniquely render the whorl 78 of each corn plant because, aside from the stalk, the whorl of a corn plant has the highest plant matter density, and hence, the highest chlorophyll density level, within each respective corn plant. Accordingly, the whorl 78 of each plant 46 can be easily identified within the false color image 74 such that the plants 46 can be counted individually on a plant-by-plant basis.

More specifically, in various implementations, the execution of the plant recognition algorithm uses a minimum threshold value for NDVI values to remove values that are not indicative of chlorophyll containing matter, e.g., soil, water and non-living plant material, such that only the pixels that represent the desired plants are recognized. For example, in embodiments wherein the desired plant to be counted is corn, it is known that corn plants have a stronger NDVI response, i.e., a higher NDVI value, as they mature. Hence, the minimum threshold value will be increased for more mature corn plants. Therefore, in various exemplary implementations, prior to the V4 stage of corn, the corn plants 46 are detected by simply setting a selected minimum threshold for the NDVI values to filter out NDVI values below the threshold, and then counting the resulting contiguous pixel regions generated in the false color image 74, each contiguous pixel region indicating a plant 46 to be counted. The growth stage is information that is provided by a system operator.

However, starting at the V4 stage, corn plants 46 will show a characteristic NDVI response at their whorls 78 that can be identified and counted via the false color image 74. Particularly, the whorls 78 in corn plants 46 act as visible light traps such that the color data values will be much reduced, but the corresponding NIR values are not reduced. Hence, the change in the NDVI values, i.e., the sharp increase in NDVI values, at the whorl 78 produces the particular plant distinguishing characteristic 78 in the false color image 74 that is indicative of a corn plant.

Additionally, the false color images 74 for all sets of image data for each camera 18 are stitched together using the image data set overlap, described above, to generate a comprehensive false color image 74 of the entire field, or of one or more particular plots within the field when the system 10 is utilized to count the plants in various plots within a field. In various embodiments, the location of each row of plants and the location of each plot within the field is entered as row and plot location data utilized by the plant recognition algorithm. Specifically, once the comprehensive false color image 74 has been generated, execution of the plant recognition algorithm will count the number of plant distinguishing characteristics 78, i.e., the number of particular plants 46 to be counted, found in the comprehensive false color image 74.

Additionally, in various implementations, execution of the plant recognition algorithm will determine the location of each identified plant 46 within the field, or plot, and compare each plant location to the entered row and plot locations. If the location of a particular plant 46 is not within the programmed row locations and, if applicable, plot locations, the particular plant 46 is filtered out, i.e., not counted. That is, if a plant 46 is identified as having the particular plant distinguishing characteristic, but the location of that plant 46 is outside of the known row locations, e.g., in a furrow, and, if applicable, outside of the known plot perimeters, e.g., in an alleyway between plots, that particular plant 46 considered not countable will be filtered from the countable plants 46 that are located within the known row locations and plot perimeters. Hence, the plants 46 in a field, or in one or more plots within the field, or within one or more particular rows can be easily and accurately counted individually on a plant-by-plant basis.

Figure 7:
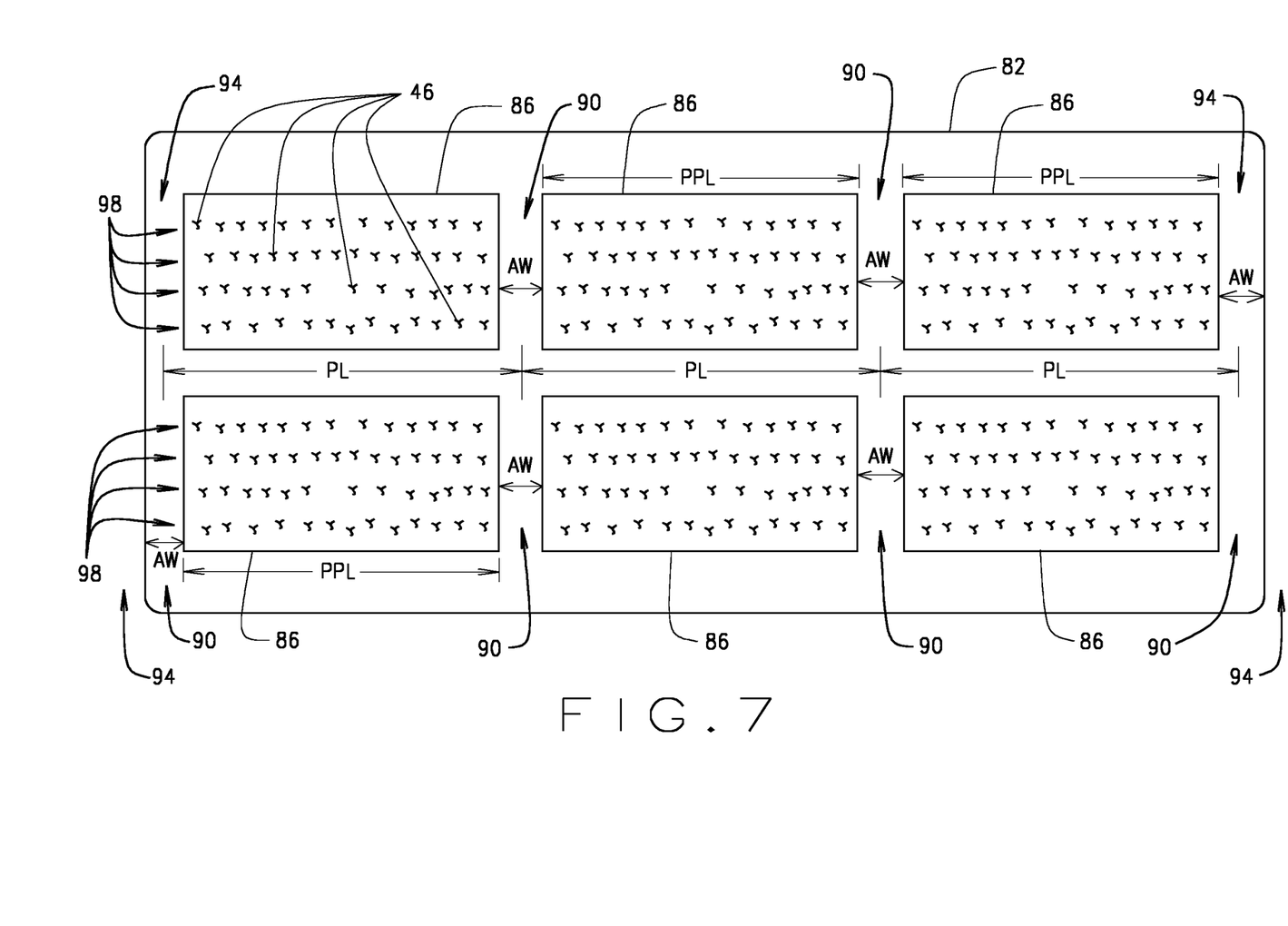
FIG. 7 is a block diagram of a field including a plurality of test plots of plants to be counted utilizing the automated self-propelled plant counting system shown in FIG. 1, in accordance with various embodiments of the present disclosure.

Referring now to FIG. 7, in various embodiments, the field (identified by reference numeral 82) can comprise a plurality of plots (identified by reference numeral 86), and alleyways 90 laterally disposed between the plots 86 and at the beginning and ends of the first and last plots 86 in the field 82. The field 82 can additionally include head lands 94 disposed at the ends of the field 82. The distance between the midpoints of the alleyways 90, i.e., the plot length (PL) of each plot 86, and the alley width (AW) of each alley 90 is provided by the system operator and utilized during execution of the plant recognition algorithm to calculate the planted plot length (PPL) of each plot 86 and isolate or parse the color and NIR image data captured for each plot from that captured for the other plots.

More specifically, in such embodiments, the system 10 is initially positioned at a head land 94 of an initial plot 86 with the wheels 62 aligned with two corresponding furrows in order to position the field of view 42 or each camera 18 in alignment with the corresponding rows of plants 46 to capture the color and NIR image data. Additionally, utilizing the geospatial location data from the GPS receiver 34, execution of the plant recognition algorithm will record the starting location of the system 10 at the head land 94. Then, as the system 10 moves through the field 82, the GPS receiver 34 will constantly communicate geospatial location data to the data processing system 38 and execution of the plant recognition algorithm will monitor, or track, the distance the system 10 travels down the rows (identified by reference numeral 98), or the location of the system within the plot 86. Subsequently, when the system 10 travels the known distance to the next alleyway 90 or head land 94, or comes to the known location of the next alleyway 90 or head land 94, execution of the plant recognition algorithm will correlate the color and NIR image data collected for the initial plot 86 with the initial plot 86. Particularly, the color and NIR image data for each plot 86 will be parsed from the color and NIR image data collected from the other plots 86. For example, separate files will be created, by execution of the plant recognition algorithm, for the color and NIR image data captured for each respective plot 86.

If the system 10 comes to an alleyway 90, the mobile platform 14 will continue to operate such that the system 10 will travel across the alleyway 90 and enter the next plot 86. Prior to entering the next plot 86 the location of the system 10 at the alleyway 90 will be recorded and, as the system 10 moves through the respective plot collecting the color and NIR image data, execution of the plant recognition algorithm will monitor, or track, the distance the system 10 travels down the rows 98, or the location of the system 10 within the respective plot 86. Then, as with the previous plot 86, when the system 10 comes to the next alleyway 90 or head land 94, execution of the plant recognition algorithm will correlate the color and NIR image data collected for the respective plot 86 with the respective plot 86. Accordingly, the plant recognition algorithm will be insensitive to gaps in the middle of any respective plot 86 that are not alleyways 90 although such gaps might appear to be.

This will continue for each subsequent plot 86 until the system 10 comes to a head land 94. Once a head land 94 is encountered, the operator of the mobile platform 14 can pause or stop the system 10, turn the system 10 around and begin collecting the color and NIR image data for additional rows 98 of plants 46 in the same plots 86, if applicable. Or, if applicable, the mobile platform can position the system 10 in alignment with rows 98 of additional plots 86 to begin collecting the color and NIR image data for additional rows 98 of plants 46 in the additional plots 86. It is envisioned that in various embodiments, the system 10 can be totally automated such that system 10 is operable to automatically turn around and begin collecting the color and NIR image data for additional rows 98 of plants 46 in the same plots 86, if applicable.

As described above, the system 10 generates the false color image 74 in real-time, as the system 10 moves though the field 82. More specifically, as the system 10 moves through a plot 86 collecting and normalizing the color and NIR image data for the respective plot 86, execution of the plant recognition algorithm will generate the false color image 74 and determine the number of plants 46 in each respective plot, as described above, as the system 10 traversed the respective plot 86, i.e., in real-time. Hence, the plant count data can accurately determine the number of plants 46 in each respective plot 86 within the field 82 and/or the number of plants 46 in the entire field 82. In various embodiments, it is envisioned that the data processing system 38 can generate a report containing at least the location of the plots 86 and the associated plant count for each respective plot 86.

It is envisioned that various methods or processes can be implemented to provide a user of the plant counting system 10 a way to evaluate the resulting data and establish a higher level of confidence in the accuracy of such data. For example, it is envisioned that execution of the plant recognition algorithm, or other suitable algorithm, can provide confidence data regarding the plant stand count generated as described above. Such confidence routine and data will be referred to herein as the stand count confidence routine, and the stand count confidence data. It is envisioned that the stand count confidence routine can comprise adding a logical ability to the processing of the data, as described above, such that the results of the analysis, i.e., the generated false color image 74 and the corresponding final plant stand counts, are classified for the user by a confidence measure of how "good" of a job the system 10 "thinks" it did counting plants in a given plot (i.e., a series of false color images 74).

In various implementations, it is envisioned that such stand count confidence data can be generated by analyzing the final plant stand count results against expected counts. Expected counts can be derived from target plant population that the planter was expected to produce during the planting process for a given field or plurality of plots. The result of the stand count confidence routine would provide a report indicating a measure of confidence to the user about plots that were above or below a predefined range of expected counts. The output of the stand count confidence routine would flag such plots and notify the user that the plant counting system 10 potentially had difficulty counting plants (too few or too many identified plant distinguishing characteristics, e.g., whorls of corn plants) for any number of reasons. Plots that may have poor stands or too high a population due to germination or planter issues would be included in this report as well. Thus, the stand count confidence routine provides the user a higher level of confidence in the performance of the plant counting system 10 as well as making it efficient for the user to quickly identify plots with potential stand count issues.

Another method or process envisioned to provide a user of the plant counting system 10 a way to evaluate the resulting data and establish a higher level of confidence in the accuracy of such data, is a method that allows the user to easily review a series of images of a plot and visually compare such images to the false color image 74 of the respective plot generated by the plant counting system 10, as described above. Since the false color image 74 consists of many images stitched together, as described above, a 'Plot Replay' utility can be executed to provide a user with method of visually reviewing the results shown in the false color images 74. For example, execution of such a 'Plot Replay' utility can provide the user an effective and efficient method to evaluate plots that have been flagged for review by the result of the stand count confidence routine described above. Particularly, utilization of the 'Plot Replay' utility will enable the user to quickly scan images of a plot, while seeing an overlay of the corresponding false color image 74 having each identified plant indicated on the by a circle on the false color image 74. The user can then make a determination regarding the accuracy of the plant count generated by the plant counting system 10 for the respective plot.

Referring now to FIGS. 2, 3, 4, 5, 5A and 7, although the system 10 is exemplarily illustrated as having two cameras 18, each having a field of view width W sized to include two rows 98 such that the system 10 will simultaneously capture the color and NIR image data for four rows 98 of plants 46, the system is not limited to this exemplary configuration. It is envisioned that the system 10 can be configured to simultaneously capture the color and NIR image data for one, two, three, five, six, seven, eight or more rows 98 of plants 46, utilizing one, two, three, four or more cameras 18, each having a field of view width W that encompasses one, two, three, four or more rows 98 of plants 46.

As described above, in various embodiments, the cameras 18 can be multispectral cameras such that the cameras 18 are able to collect image data for wavelengths that are beyond the visible spectrum. Therefore, although the system 10 has been described herein as being structured and operable for counting plants 46 within the field 82, one or more plots 86 within the field 82, or one or more particular rows 98, the cameras 18 provide the ability to not only count the plants 46, as described above, but to analyze the plants 46 as the system 10 moves through the field 82. For example, in various embodiments, via the multispectral cameras 18, or multispectral cameras combined with other imaging or remote sensing technologies, the system 10 can be utilized to provide information regarding such things as nitrogen levels within the plants 46, spatial arrangement of the plants 46, plant height, corn ear height, plant color, and time-related data for determining plant vigor ratings, leaf area index, biomass estimates, chlorosis, geo-referenced location of individual plants within a field, etc.

Additionally, although the system 10 has been described herein as having the computer based data processing system 38 disposed on mobile platform 14, it is envisioned that the computer based data processing system 38 can be a multi-part system having only a portion of the multi-part system disposed on the mobile platform 10. For example, in various embodiments, the data processing system 38 can include a first part disposed on the mobile platform 38, wherein the first part is structured and operable to execute a first portion of the plant recognition algorithm to collect/capture the color and NIR image data as described above. In such embodiments, the data processing system 38 can include a second part residing at a remote location, e.g., a laboratory, wherein the second part is structured and operable to execute a second portion of the plant recognition algorithm to analyze the collected/captured color and NIR image data and generate the false color image 74 as described above.

Furthermore, although the features, functions and operation of the system 10 and the corresponding methods for determining plant counts have been generally described herein with regard to counting plants in a research environment, it is envisioned that the system 10 and methods for determining plant counts described above are equally applicable for use in a commercial environment for obtaining plant counts to determine such things as yield estimates, and remain within the scope of the present disclosure.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A method for detecting and counting individual plants of a selected type growing in a field, said method comprising:

capturing color image data and near infrared (NIR) image data of a plurality of plants growing in a field utilizing a self-propelled mobile platform having one or more multispectral cameras suspended above a ground surface;

calculating, for each pixel, a ratio value between the corresponding color image data and the corresponding NIR image data and assigning a color to each calculated ratio value utilizing a plant recognition algorithm executed via a data processing system;

generating, via execution of the plant recognition algorithm, a false color image based on the colors assigned to each calculated ratio value;

defining a selected type of plant from among the plurality of plants growing in the field that has a particular plant characteristic;

identifying, via execution of the plant recognition algorithm, individual plants of the selected type amongst the plurality of plants growing in the field utilizing the false color image; and counting, via execution of the plant recognition algorithm, the individual plants of the selected type.

2. The method of claim 1, wherein generating the false color image comprises assigning, via execution of the plant recognition algorithm, a particular color to specific ratio values such that at least one pixel is assigned a color based on the respective ratio value.

3. The method of claim 2, wherein assigning a particular color to specific ratio values comprises:

assigning ratio values below a threshold value of light neutral background colors indicating one of soil, water and non-living plant material present in the field; and assigning ratio values above the predetermined threshold value of darker colors that contrast with the background colors indicating the varying chlorophyll levels of plant material within the field.

4. The method of claim 1, wherein the characteristic is a plant phenotype.

5. The method of claim 4, wherein the plant phenotype is revealed in the false color image data.

6. The method of claim 1, wherein the characteristic is an observable plant phenotype revealed in the false color image data that can be used to distinguish individual plants.

7. The method of claim 1, wherein the characteristic is a plant morphology phenotype.

8. The method of claim 1, wherein the characteristic is a plant phenotype related to at least one of a nitrogen level within identified plants, a spatial arrangement of identified plants, a plant height of identified plants, a plant vigor rating for identified plants, a leaf area index for identified plants, a biomass estimate for identified plants, a chlorosis rating for identified plants, a normalized difference vegetative index for identified plants, and a geo-referenced location for identified plants.

9. The method of claim 1, further comprising analyzing the captured color image data and/or the captured NIR image data for identified plants to determine at least one of a nitrogen level within identified plants, a spatial arrangement of identified plants, a plant height of identified plants, a plant vigor rating for identified plants, a leaf area index for identified plants, a biomass estimate for identified plants, a chlorosis rating for identified plants, a normalized difference vegetative index for identified plants, and a geo-referenced location for identified plants.

* * * * *